(12) United States Patent
Kim et al.

(10) Patent No.: US 9,507,168 B2
(45) Date of Patent: Nov. 29, 2016

(54) STEREOSCOPIC IMAGE DISPLAY HAVING PATTERN GROOVE

(75) Inventors: Jinyeong Kim, Gyeonggi-do (KR); Sungpil Ryu, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1119 days.

(21) Appl. No.: 13/530,476

(22) Filed: Jun. 22, 2012

(65) Prior Publication Data

US 2013/0100258 A1    Apr. 25, 2013

(30) Foreign Application Priority Data

Oct. 21, 2011    (KR) .................. 10-2011-0108180

(51) Int. Cl.
| | | |
|---|---|---|
| H04N 13/04 | (2006.01) | |
| G02B 27/26 | (2006.01) | |
| G02B 27/22 | (2006.01) | |
| G02F 1/1347 | (2006.01) | |

(52) U.S. Cl.
CPC .......... *G02B 27/26* (2013.01); *G02F 1/13471* (2013.01); *H04N 13/0434* (2013.01)

(58) Field of Classification Search
CPC .............. G02B 27/26; G02F 1/13471; H04N 13/0434
USPC ........................................................ 348/51
See application file for complete search history.

(56) References Cited

U.S. PATENT DOCUMENTS

| | | | | |
|---|---|---|---|---|
| 7,414,594 B2* | 8/2008 | Kim | ................. | G02F 1/133526 345/1.1 |
| 7,942,541 B2* | 5/2011 | Kang | ................. | G02B 5/001 349/15 |
| 8,045,092 B2* | 10/2011 | Jeong et al. | ................. | 349/62 |
| 2002/0036825 A1* | 3/2002 | Lipton | ............... | G02B 27/2214 359/463 |
| 2008/0007835 A1* | 1/2008 | Lim | ........................ | G02B 5/22 359/602 |
| 2010/0289884 A1* | 11/2010 | Kang | ................. | G02B 27/2228 348/58 |
| 2011/0001903 A1* | 1/2011 | Kang et al. | ................. | 349/96 |
| 2011/0080723 A1* | 4/2011 | Kaluzhny | .............. | G03B 21/62 362/84 |
| 2011/0216177 A1* | 9/2011 | Chae et al. | ................. | 348/57 |
| 2011/0227886 A1* | 9/2011 | Lee et al. | ................. | 345/204 |
| 2011/0298792 A1* | 12/2011 | Lim | ................. | 345/419 |
| 2012/0154450 A1* | 6/2012 | Aho | ................. | G02B 27/22 345/690 |
| 2014/0204185 A1* | 7/2014 | Liu | ................. | G02B 26/0875 348/54 |

FOREIGN PATENT DOCUMENTS

CN        102279484 A        12/2011

OTHER PUBLICATIONS

Chinese Office Action dated Jul. 17, 2014 for corresponding Chinese Patent Application No. 201210164769.8.

\* cited by examiner

*Primary Examiner* — Jessica M Prince
(74) *Attorney, Agent, or Firm* — Morgan, Lewis & Bockius LLP

(57) ABSTRACT

A stereoscopic image display includes a display panel including subpixels, a polarizing plate attached to a display surface of the display panel, a patterned retarder film attached to one surface of the polarizing plate, and a pattern groove including an air layer which is formed on one surface of an upper substrate of the display panel contacting the polarizing plate at a location corresponding to a boundary between the subpixels. The pattern groove includes a plurality of peaks and a plurality of valleys and forms a triangular cross section along with a portion of the upper substrate contacting the polarizing plate, thereby providing the air layer.

22 Claims, 9 Drawing Sheets

STEREOSCOPIC IMAGE DISPLAY HAVING PATTERN GROOVE

This application claims the benefit of Korean Patent Application No. 10-2011-0108180 filed on Oct. 21, 2011, the entire contents of which is incorporated herein by reference for all purposes as if fully set forth herein.

BACKGROUND OF THE INVENTION

Field of the Invention

Embodiments of the invention relate to a stereoscopic image display capable of implementing a two-dimensional plane image (hereinafter referred to as '2D image') and a three-dimensional stereoscopic image (hereinafter referred to as '3D image').

Discussion of the Related Art

Recently, a stereoscopic image display capable of selectively implementing a 2D image and a 3D image has been developed and has been put on the market due to the development of various contents and circuit technology. Examples of a method for implementing the 3D image of the stereoscopic image display roughly include a stereoscopic technique and an autostereoscopic technique.

The stereoscopic technique, which uses a parallax image between left and right eyes of a user with a high stereoscopic effect, includes a glasses type method and a non-glasses type method, both of which have been put to practical use. In the glasses type method, left and right eye images each having a different polarization direction are displayed on a direct-view liquid crystal display panel or a projector in a time-division manner, and a stereoscopic image is implemented using polarized glasses or liquid crystal shutter glasses. In the non-glasses type method, an optical plate such as a parallax barrier for separating an optical axis of the parallax image between the left and right eyes is generally installed in front of or behind a display screen.

A patterned retarder film alternately mixes the left eye image and the right eye image, thereby displaying the 3D image in an interlace manner For this, light passing through odd-numbered lines (or even-numbered lines) of the patterned retarder film is converted into right circularly polarized light, and light passing through even-numbered lines (or odd-numbered lines) of the patterned retarder film is converted into left circularly polarized light. Hence, the patterned retarder film separates the image displayed on the display panel into the left eye image and the right eye image.

A black stripe is formed between the odd-numbered line and the even-numbered line of the related art patterned retarder film to thereby increase a vertical viewing angle. However, the black stripe results in a reduction in a transmittance when the 2D image is displayed. Hence, a luminance of the stereoscopic image display is reduced. Accordingly, the improvement of the black stripe is required.

SUMMARY OF THE INVENTION

In one aspect, there is a stereoscopic image display including a display panel including subpixels, a polarizing plate attached to a display surface of the display panel, a patterned retarder film attached to one surface of the polarizing plate, and a pattern groove including an air layer which is formed on one surface of an upper substrate of the display panel contacting the polarizing plate at a location corresponding to a boundary between the subpixels.

In another aspect, there is a stereoscopic image display including a display panel including subpixels, a polarizing plate positioned on a display surface of the display panel, a patterned retarder film attached to one surface of the polarizing plate, and a pattern film attached between the display panel and the polarizing plate, the pattern film including a pattern groove having an air layer which is formed on one surface of the pattern film contacting the polarizing plate at a location corresponding to a boundary between the subpixels.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Example embodiments of the invention will be described with reference to FIGS. 1 to 15.

Figure 1:
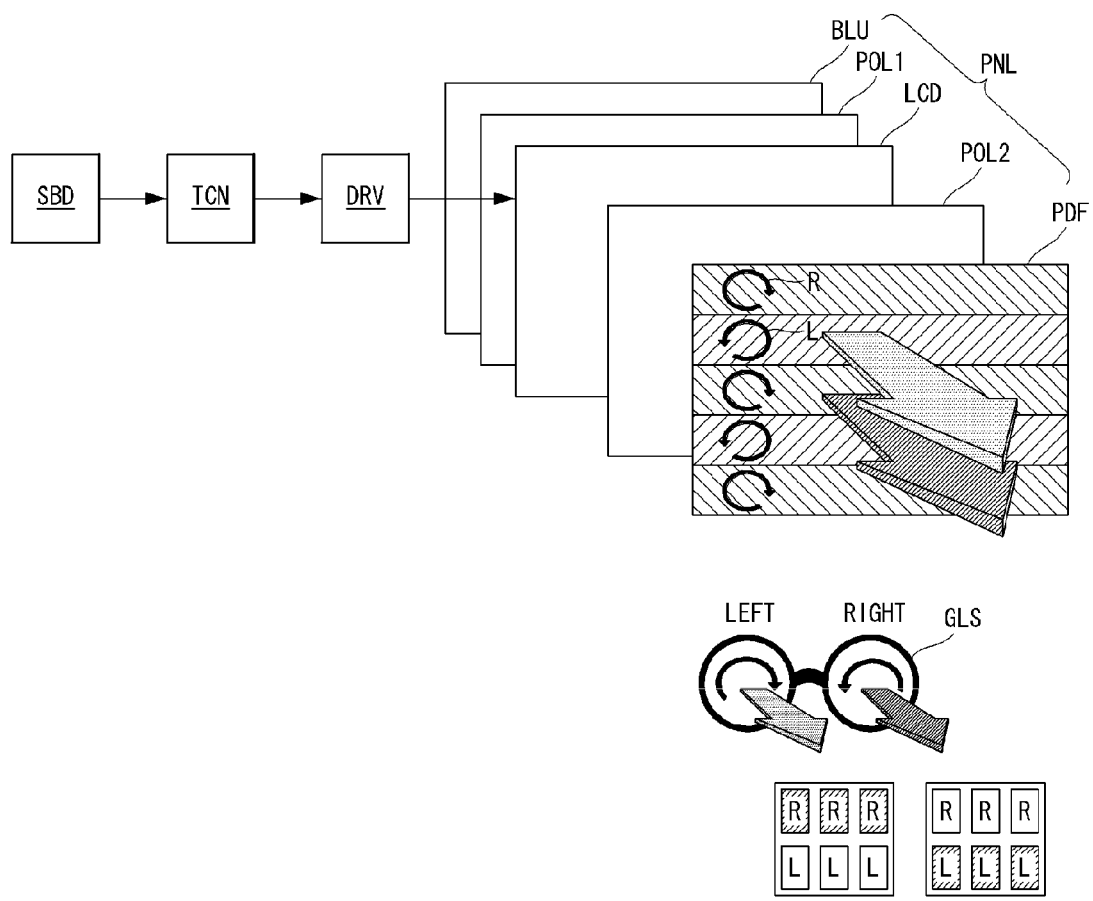
FIG. 1 schematically illustrates a configuration of a stereoscopic image display.
Figure 2:
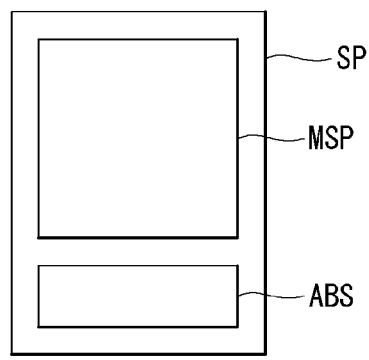
FIG. 2 illustrates a configuration of a subpixel of a liquid crystal display panel shown in FIG. 1.

FIG. 1 schematically illustrates a configuration of a stereoscopic image display. FIG. 2 illustrates a configuration of a subpixel of a liquid crystal display panel shown in FIG. 1.

As shown in FIG. 1, a stereoscopic image display includes an image supply unit SBD, a timing controller TCN, a driver DRV, a display panel PNL, a patterned retarder film FPR, and polarized glasses GLS.

The image supply unit SBD produces 2D image frame data in a 2D mode and produces 3D image frame data in a 3D mode. The image supply unit SBD supplies timing signals, such as a vertical sync signal Vsync, a horizontal sync signal Hsync, a data enable DE, and a main clock, and the 2D and 3D image frame data to the timing controller TCN.

The image supply unit SBD selects the 2D or 3D mode based on a user selection input through a user interface and produces the 2D or 3D image frame data corresponding to the selected 2D or 3D mode. The image supply unit SBD supplies the 2D or 3D image frame data to the timing controller TCN. The user interface includes a user input device such as an on-screen display (OSD), a remote controller, a keyboard, and a mouse. Hereinafter, the embodiment of the invention describes that the image supply unit SBD selects the 3D mode and supplies the 3D image frame data to the timing controller TCN as an example.

The timing controller TCN receives 3D image frame data including left eye image frame data and right eye image frame data from the image supply unit SBD. The timing controller TCN alternately supplies the left eye image frame data and the right eye image frame data to the driver DRV at a frame frequency equal to or greater than 120 Hz. Further, the timing controller TCN supplies a control signal corresponding to the image frame data to the driver DRV.

The driver DRV includes a data driver, which is connected to data lines and supplies a data signal, and a gate driver which is connected to gate lines and supplies a gate signal. The data driver of the driver DRV converts digital type left and right eye image frame data into analog type left and right eye image frame data under the control of the timing controller TCN and supplies the analog type left and right eye image frame data to the data lines. The gate driver of the driver DRV sequentially supplies the gate signal to the gate lines under the control of the timing controller TCN.

The display panel PNL receives the gate signal and the data signal from the driver DRV. The display panel PNL includes subpixels displaying a 2D image or a 3D image corresponding to the gate signal and the data signal. The display panel PNL may include a backlight unit BLU and a liquid crystal display panel LCD. Alternatively, the display panel PNL may include various panels such as an organic light emitting display panel and a plasma display panel, instead of the liquid crystal display panel LCD.

The liquid crystal display panel LCD includes a lower substrate (hereinafter referred to as "TFT substrate"), on which thin film transistors (TFTs), capacitors, etc. are formed, and an upper substrate (hereinafter referred to as "color filter substrate"), on which color filters, black matrixes, etc. are formed. The liquid crystal display panel LCD includes the subpixels including a liquid crystal layer formed between the TFT substrate and the color filter substrate.

As shown in FIG. 2, each of the subpixels includes a main subpixel MSP and an active black stripe ABS which is less than the size of the main subpixel MSP.

When the liquid crystal display panel LCD is driven in the 2D mode, the main subpixel MSP and the active black stripe ABS are equally driven so as to display the 2D image. On the other hand, when the liquid crystal display panel LCD is driven in the 3D mode, the main subpixel MSP is driven so as to display the 3D image and the active black stripe ABS is driven so as to display a black image. In other words, the active black stripe ABS prevents a mixture of the 3D images in the 3D mode.

The liquid crystal display panel LCD may be implemented in any liquid crystal mode including a twisted nematic (TN) mode, a vertical alignment (VA) mode, an in-plane switching (IPS) mode, and a fringe field switching (FFS) mode. Other liquid crystal modes may be used for the liquid crystal display panel LCD. A lower polarizing plate POL1 and an upper polarizing plate POL2 are respectively attached to the TFT substrate (corresponding to a non-display surface) and the color filter substrate (corresponding to a display surface) of the liquid crystal display panel LCD. The liquid crystal display panel LCD having the above-described configuration may display an image using light provided by the backlight unit BLU.

The backlight unit BLU is driven under the control of the image supply unit SBD or the timing controller TCN and provides the liquid crystal display panel LCD with light. The backlight unit BLU includes light sources for emitting light, a light guide plate for guiding light emitted from the light sources toward the liquid crystal display panel LCD, optical members for diffusing and focusing light emitted from the light guide plate, etc.

The backlight unit BLU may be implemented as an edge type backlight unit, a dual type backlight unit, a quad type backlight unit, or a direct type backlight unit, etc. In the edge type backlight unit, the light sources are disposed on one side of the liquid crystal display panel LCD. In the dual type backlight unit, the light sources are disposed on the opposite sides of the liquid crystal display panel LCD. In the quad type backlight unit, the light sources are disposed on four sides of the liquid crystal display panel LCD. In the direct type backlight unit, the light sources are disposed on the lower side of the liquid crystal display panel LCD.

The patterned retarder film FPR alternately mixes the left eye image and the right eye image displayed on the liquid crystal display panel LCD, thereby displaying the image in an interlace manner. For this, light passing through odd-numbered lines (or even-numbered lines) of the patterned retarder film FPR is converted into right circularly polarized light R, and light passing through even-numbered lines (or odd-numbered lines) of the patterned retarder film FPR is converted into left circularly polarized light L. Hence, the patterned retarder film FPR separates the image displayed on the liquid crystal display panel LCD into the left eye image and the right eye image.

The polarized glasses GLS separate the image emitted through the patterned retarder film FPR into the left eye image and the right eye image. A left eyeglass LEFT of the polarized glasses GLS transmits only the left eye image emitted through the patterned retarder film FPR, and a right eyeglass RIGHT of the polarized glasses GLS transmits only the right eye image emitted through the patterned retarder film FPR.

According to the above-described configuration of the stereoscopic image display, the stereoscopic image display alternately displays the left eye image and the right eye image on the liquid crystal display panel LCD in each frame, and the patterned retarder film FPR separately emits the left eye image and the right eye image. Hence, a user wearing the polarized glasses GLS may feel the 3D image.

A structure of the stereoscopic image display according to the embodiment of the invention is described in more detail below.

<First Embodiment>

Figure 3:
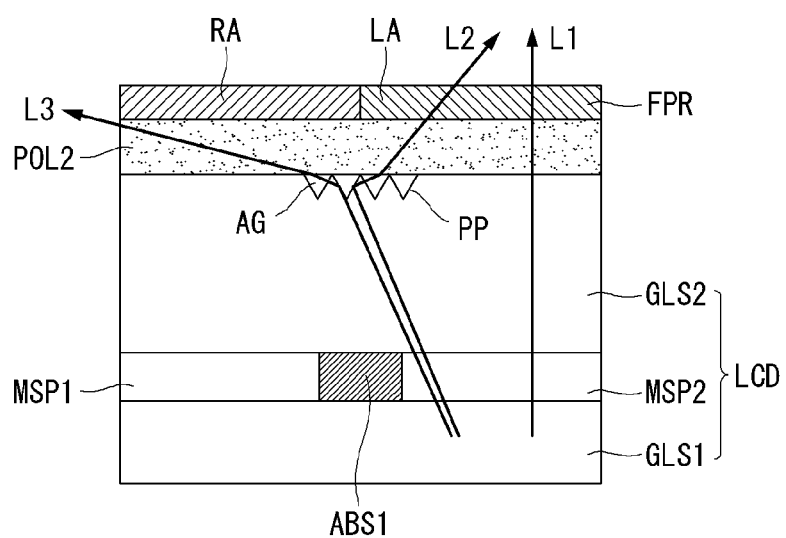
FIG. 3 is a partial cross-sectional view of a stereoscopic image display according to a first embodiment of the invention.
Figure 4:
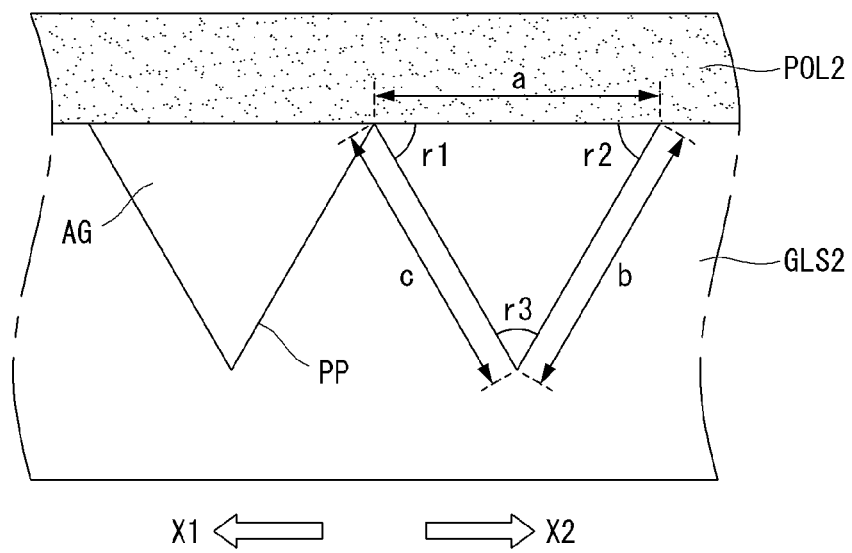
FIG. 4 illustrates a pattern groove shown in FIG. 3.

FIG. 3 is a partial cross-sectional view of a stereoscopic image display according to a first embodiment of the invention. FIG. 4 illustrates a pattern groove shown in FIG. 3.

As shown in FIG. 3, the stereoscopic image display according to the first embodiment of the invention includes a liquid crystal display panel LCD, an upper polarizing plate POL2 attached to a display surface of the liquid crystal display panel LCD, and a patterned retarder film FPR attached to one surface of the upper polarizing plate POL2.

A color filter substrate GLS2 of the liquid crystal display panel LCD includes a pattern groove PP on one surface of the color filter substrate GLS2 contacting the upper polarizing plate POL2. The pattern groove PP has an air layer AG at a location corresponding to a boundary between subpixels MSP1 and MSP2. The boundary between the subpixels MSP1 and MSP2 corresponds to an active black stripe ABS1 which is driven so as to display a black image when the liquid crystal display panel LCD is driven in the 3D mode. Thus, the plurality of pattern grooves PP are formed in a horizontal direction at locations corresponding to the active black stripes ABS1 of the liquid crystal display panel LCD.

The pattern groove PP formed on one surface of the color filter substrate GLS2 is a groove including a plurality of peaks and a plurality of valleys and is patterned so as to provide the air layer AG. The pattern groove PP may be formed through the etching using an etching method or a laser method. Other methods may be used depending on a shape of the pattern groove PP.

The pattern groove PP including the plurality of peaks and valleys forms a prism shape having a triangular cross section along with a portion of one surface of the color filter substrate GLS2 contacting the upper polarizing plate POL2, thereby providing the air layer AG. Because the pattern groove PP has the prism shape for the air layer AG, light passing through the pattern groove PP is totally reflected or diffusely reflected by a structural shape of the pattern groove PP and a difference between refractive indexes of the components.

Examples of total reflection and diffuse reflection resulting from the structural shape of the pattern groove PP and the difference between the refractive indexes of the components are described below.

Linear light L1 linearly passing through the second main subpixel MSP2 passes through the color filter substrate GLS2 and the upper polarizing plate POL2 and then is emitted from a left circularly polarized area LA of the patterned retarder film FPR.

On the other hand, first oblique light L2 and second oblique light L3 obliquely passing through the pattern groove PP corresponding to the first active black stripe ABS1 of a subpixel adjacent to the second main subpixel MSP2 are refracted as follows.

The first oblique light L2 is refracted by the pattern groove PP and then is emitted from the left circularly polarized area LA of the patterned retarder film FPR.

The second oblique light L3 is refracted by the pattern groove PP and travels along the upper polarizing plate POL2. Then, the second oblique light L3 is emitted from a left circularly polarized area LA in a next area of the patterned retarder film FPR. Alternatively, the second oblique light L3 may be again refracted by the color filter substrate GLS2 or the upper polarizing plate POL2. In FIG. 3, 'RA' denotes a right circularly polarized area of the patterned retarder film FPR.

A refractive index of the color filter substrate GLS2 generally formed of glass is about 1.5, a refractive index of the air layer AG is about 1.0, and a refractive index of the upper polarizing plate POL2 is about 1.3 to 1.4. Thus, a reason why light passing through the pattern groove PP having the air layer AG is totally reflected or diffusely reflected is that the structural shape of the pattern groove PP controls an optical angle and also there is a difference between the refractive indexes of the color filter substrate GLS2, the air layer AG, and the upper polarizing plate POL2.

As shown in FIG. 4, the pattern groove PP including the plurality of peaks and valleys forms the triangular cross section along with the portion of the color filter substrate GLS2 contacting the upper polarizing plate POL2, thereby forming the air layer AG. Lengths of three sides a, b, and c forming the triangular cross section may be substantially equal to or different from one another. Further, interior angles r1, r2, and r3 formed by the three sides a, b, and c may be substantially equal to or different from one another. In other words, the pattern groove PP may form the triangular cross section having various shapes along with the portion of the color filter substrate GLS2 contacting the upper polarizing plate POL2.

The pattern groove PP is formed at a location corresponding to the boundary (i.e., the active black stripe) between the main subpixels. Thus, the number and lengths of peaks, the number and lengths of valleys, and the interior angles formed by the peaks and the valleys in the pattern groove PP may varied depending on the material of the color filter substrate GLS2, the material of the upper polarizing plate POL2, and a width of the active black stripe. Namely, the shape of the pattern groove PP may be optimized suitable for the material and design values of the stereoscopic image display according to the embodiment of the invention.

Various examples of the pattern groove PP formed on one surface of the color filter substrate GLS2 are described below.

Figure 5:
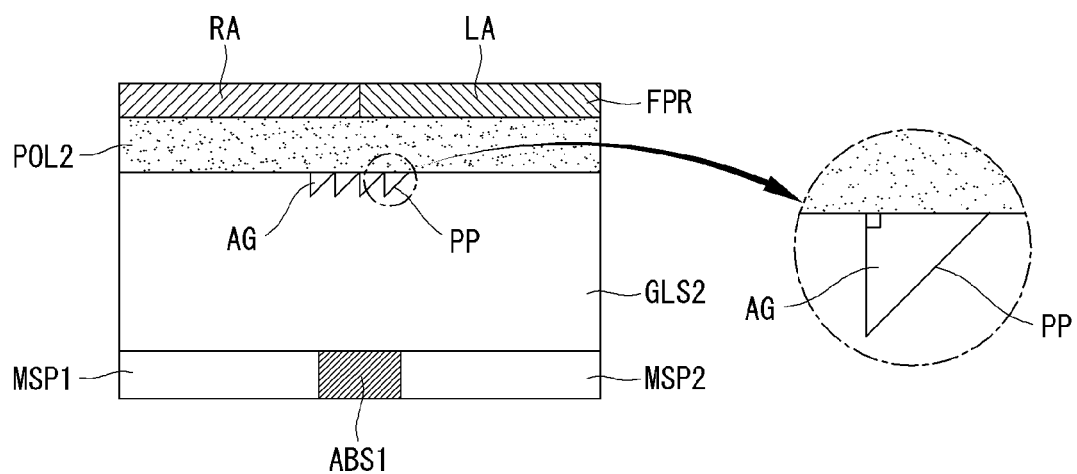
FIG. 5 is a schematic cross-sectional view of a stereoscopic image display including a pattern groove having a right triangle shape.
Figure 6:
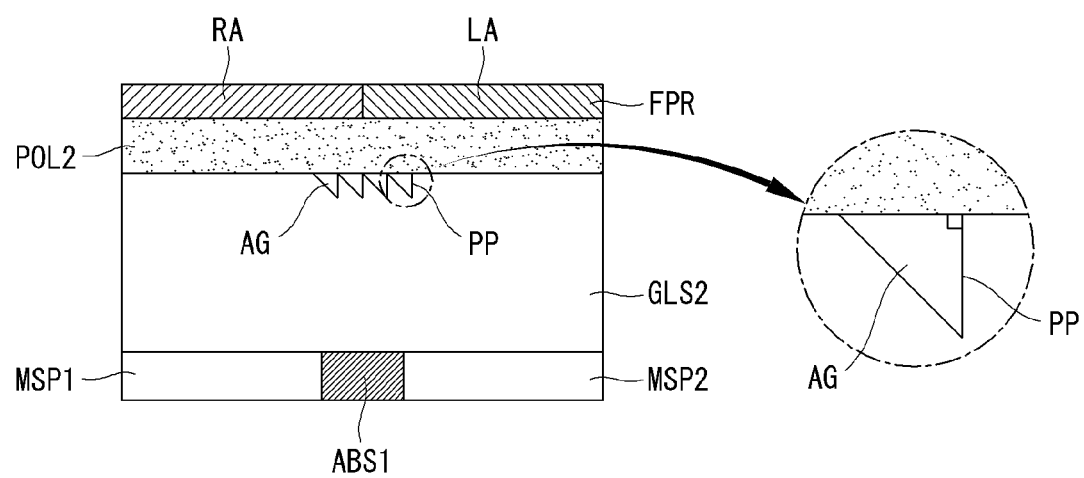
FIG. 6 is a schematic cross-sectional view of a stereoscopic image display including a pattern groove having a right triangle shape different from the right triangle shape shown in FIG. 5.
Figure 7:
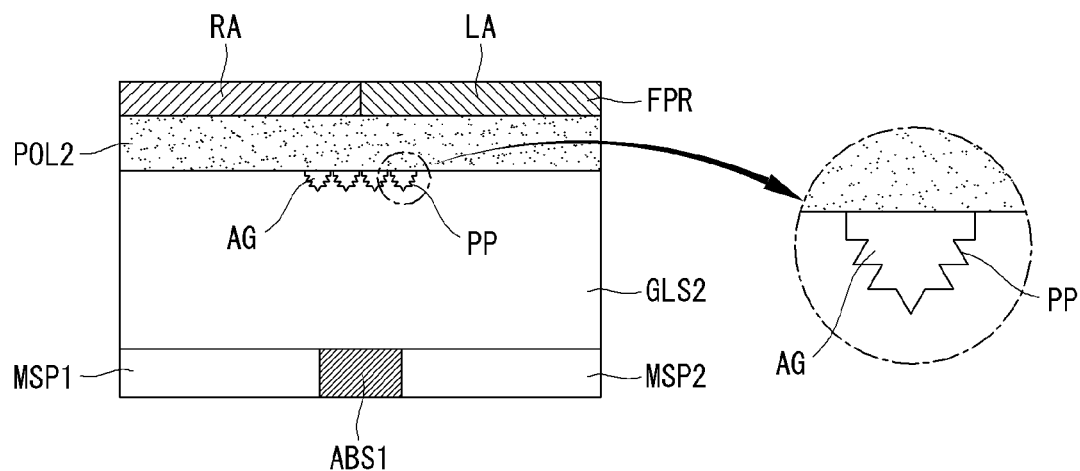
FIG. 7 is a schematic cross-sectional view of a stereoscopic image display including a triangular pattern groove having a discontinuous surface.
Figure 8:
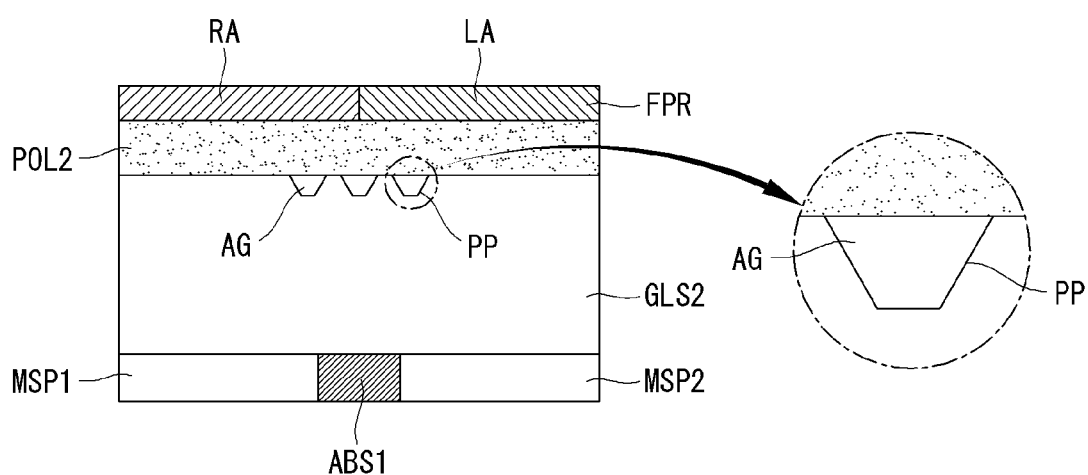
FIG. 8 is a schematic cross-sectional view of a stereoscopic image display including a pattern groove having a trapezoid shape.

FIG. 5 is a schematic cross-sectional view of the stereoscopic image display including the pattern groove having a right triangle shape. FIG. 6 is a schematic cross-sectional view of the stereoscopic image display including the pattern groove having a right triangle shape different from the right triangle shape shown in FIG. 5. FIG. 7 is a schematic cross-sectional view of the stereoscopic image display including the triangular pattern groove having a discontinuous surface. FIG. 8 is a schematic cross-sectional view of the stereoscopic image display including the pattern groove having a trapezoid shape.

As shown in FIG. 5, the pattern groove PP has the right triangle shape, so that the air layer Ag is provided on one surface of the color filter substrate GLS2 contacting the upper polarizing plate POL2 at the location corresponding to the boundary between the subpixels MSP1 and MSP2.

As shown in FIG. 6, the pattern groove PP has the right triangle shape, in which an oblique direction of a hypotenuse is different from the right triangle shape shown in FIG. 5, so that the air layer Ag is provided on one surface of the color filter substrate GLS2 contacting the upper polarizing plate POL2 at the location corresponding to the boundary between the subpixels MSP1 and MSP2.

As shown in FIG. 7, the pattern groove PP has the triangle shape having the discontinuous surface, so that the air layer Ag is provided on one surface of the color filter substrate GLS2 contacting the upper polarizing plate POL2 at the location corresponding to the boundary between the subpixels MSP1 and MSP2.

So far, the embodiment of the invention described the triangular pattern groove PP. Other shapes may be used for pattern groove PP. For example, as shown in FIG. 8, the pattern groove PP may have the trapezoid shape, so that the air layer Ag is provided on one surface of the color filter substrate GLS2 contacting the upper polarizing plate POL2 at the location corresponding to the boundary between the subpixels MSP1 and MSP2.

<Second Embodiment>

Figure 9:
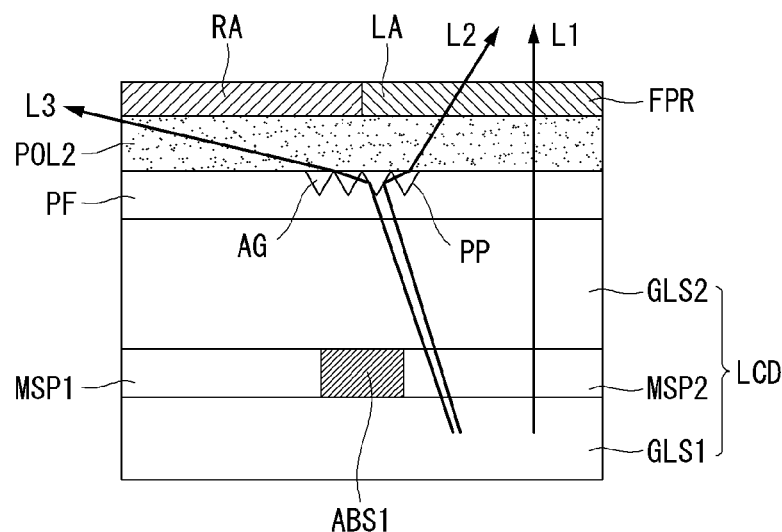
FIG. 9 is a partial cross-sectional view of a stereoscopic image display according to a second embodiment of the invention.

FIG. 9 is a partial cross-sectional view of a stereoscopic image display according to a second embodiment of the invention.

As shown in FIG. 9, the stereoscopic image display according to the second embodiment of the invention includes a liquid crystal display panel LCD, an upper polarizing plate POL2 attached to a display surface of the liquid crystal display panel LCD, a patterned retarder film FPR attached to the upper polarizing plate POL2, and a pattern film PF attached between the liquid crystal display panel LCD and the upper polarizing plate POL2.

The pattern film PF includes a pattern groove PP on one surface of the pattern film PF contacting the upper polarizing plate POL2. The pattern groove PP has an air layer AG at a location corresponding to a boundary between subpixels MSP1 and MSP2. The boundary between the subpixels MSP1 and MSP2 corresponds to an active black stripe ABS1 which is driven so as to display a black image when the liquid crystal display panel LCD is driven in the 3D mode. Thus, the plurality of pattern grooves PP are formed in a horizontal direction at locations corresponding to the active black stripes ABS1 of the liquid crystal display panel LCD.

The pattern groove PP formed on one surface of the pattern film PF is a groove including a plurality of peaks and a plurality of valleys and is patterned so as to provide the air layer AG. The pattern groove PP may be formed through the etching using an etching method or a laser method. Other methods may be used depending on a shape of the pattern groove PP.

The pattern groove PP including the plurality of peaks and valleys forms a prism shape having a triangular cross section along with one surface of the pattern film PF contacting the upper polarizing plate POL2, thereby providing the air layer AG. Because the pattern groove PP has the prism shape for the air layer AG, light passing through the pattern groove PP is totally reflected or diffusely reflected by a structural shape of the pattern groove PP and a difference between refractive indexes of the components.

Examples of total reflection and diffuse reflection resulting from the structural shape of the pattern groove PP and the difference between the refractive indexes of the components are described below.

Linear light L1 linearly passing through the second main subpixel MSP2 passes through the color filter substrate GLS2, the pattern film PF, and the upper polarizing plate POL2 and then is emitted from a left circularly polarized area LA of the patterned retarder film FPR.

On the other hand, first oblique light L2 and second oblique light L3 obliquely passing through the pattern groove PP corresponding to the first active black stripe ABS1 of a subpixel adjacent to the second main subpixel MSP2 are refracted as follows.

The first oblique light L2 is refracted by the pattern groove PP and then is emitted from the left circularly polarized area LA of the patterned retarder film FPR.

The second oblique light L3 is refracted by the pattern groove PP and travels along the upper polarizing plate POL2. Then, the second oblique light L3 is emitted from a left circularly polarized area LA in a next area of the patterned retarder film FPR. Alternatively, the second oblique light L3 may be again refracted by the color filter substrate GLS2 or the upper polarizing plate POL2. In FIG. 9, 'RA' denotes a right circularly polarized area of the patterned retarder film FPR.

A refractive index of the color filter substrate GLS2 generally formed of glass is about 1.5, a refractive index of the air layer AG is about 1.0, and a refractive index of the upper polarizing plate POL2 is about 1.3 to 1.4. Thus, a reason why light passing through the pattern groove PP having the air layer AG is totally reflected or diffusely reflected is that the structural shape of the pattern groove PP controls an optical angle and also there is a difference between the refractive indexes of the color filter substrate GLS2, the air layer AG, and the upper polarizing plate POL2.

The pattern film PF may be formed of the same material (i.e., glass) as the color filter substrate GLS2 of the liquid crystal display panel LCD. Alternatively, the pattern film PF may be formed of a resin-based material such as polyethersulfone (PES), polyethylene terephthalate (PET), polyethylene naphthalate (PEN), polyimide (PI), and polycarbonate (PC). Thus, if the pattern film PF is formed of glass, the pattern film PF may have a refractive index of about 1.5. If the pattern film PF is formed of the resin-based material, the pattern film PF may have a refractive index of about 1.3 to 1.4.

The pattern groove PP of the pattern film PF including the plurality of peaks and valleys forms the triangular cross section along with a portion of the pattern groove PP contacting the upper polarizing plate POL2, thereby forming the air layer AG, in the same manner as the first embodiment illustrated in FIG. 4. Lengths of three sides a, b, and c forming the triangular cross section may be substantially equal to or different from one another. Further, interior angles r1 r2, and r3 formed by the three sides a, b, and c may be substantially equal to or different from one another. In other words, the pattern groove PP may form the triangular cross section having various shapes along with the portion of the pattern film PF contacting the upper polarizing plate POL2.

The pattern groove PP is formed at a location corresponding to the boundary (i.e., the active black stripe) between the main subpixels. Thus, the number and lengths of peaks, the number and lengths of valleys, and the interior angles formed by the peaks and the valleys in the pattern groove PP may varied depending on the material of the pattern film PF, the material of the upper polarizing plate POL2, and a width of the active black stripe. Namely, the shape of the pattern groove PP may be optimized suitable for the material and design values of the stereoscopic image display according to the embodiment of the invention.

Various examples of the pattern groove PP formed on one surface of the pattern film PF are described below.

Figure 10:
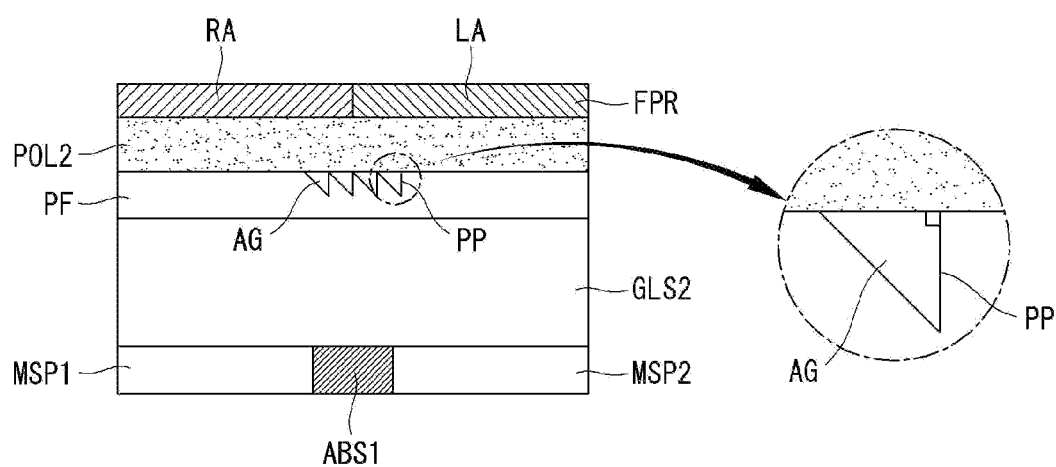
FIG. 10 is a schematic cross-sectional view of a stereoscopic image display including a pattern groove having a right triangle shape.
Figure 11:
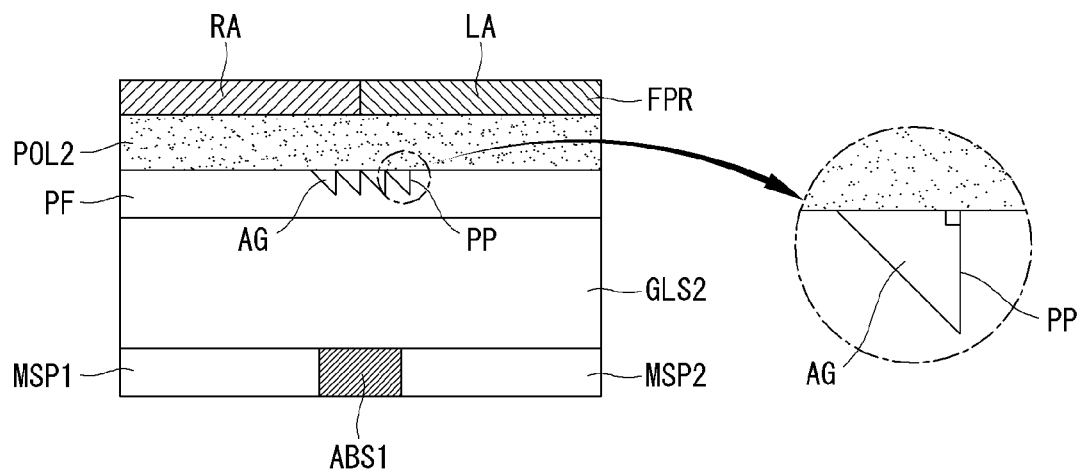
FIG. 11 is a schematic cross-sectional view of a stereoscopic image display including a pattern groove having a right triangle shape different from the right triangle shape shown in FIG. 10.
Figure 12:
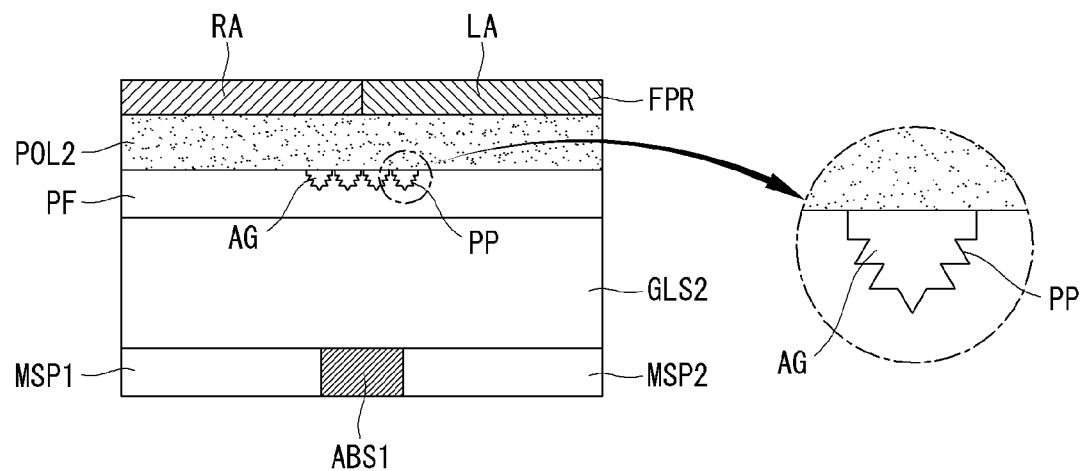
FIG. 12 is a schematic cross-sectional view of a stereoscopic image display including a triangular pattern groove having a discontinuous surface.
Figure 13:
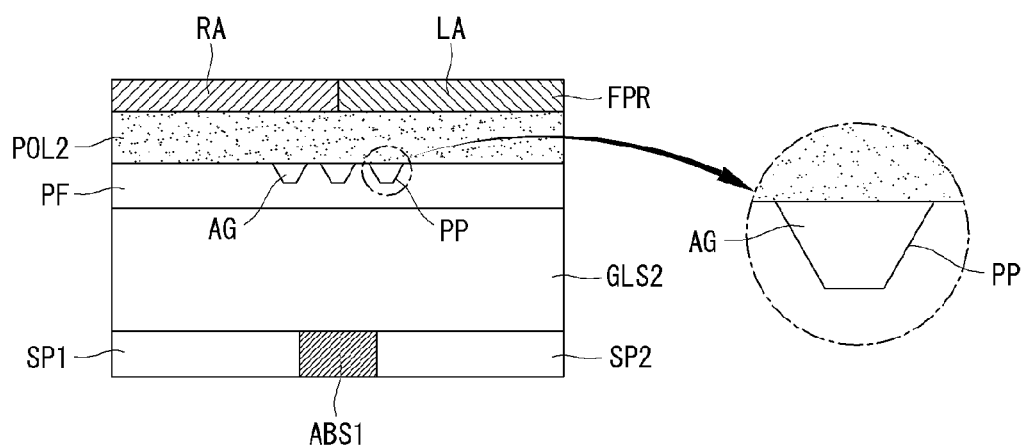
FIG. 13 is a schematic cross-sectional view of a stereoscopic image display including a pattern groove having a trapezoid shape.

FIG. 10 is a schematic cross-sectional view of the stereoscopic image display including the pattern groove having a right triangle shape. FIG. 11 is a schematic cross-sectional view of the stereoscopic image display including the pattern groove having a right triangle shape different from the right triangle shape shown in FIG. 10. FIG. 12 is a schematic cross-sectional view of the stereoscopic image display including the triangular pattern groove having a discontinuous surface. FIG. 13 is a schematic cross-sectional view of the stereoscopic image display including the pattern groove having a trapezoid shape.

As shown in FIG. 10, the pattern groove PP has the right triangle shape, so that the air layer Ag is provided on one surface of the pattern film PF contacting the upper polarizing plate POL2 at the location corresponding to the boundary between the subpixels MSP1 and MSP2.

As shown in FIG. 11, the pattern groove PP has the right triangle shape, in which an oblique direction of a hypotenuse is different from the right triangle shape shown in FIG. 10, so that the air layer Ag is provided on one surface of the pattern film PF contacting the upper polarizing plate POL2 at the location corresponding to the boundary between the subpixels MSP1 and MSP2.

As shown in FIG. 12, the pattern groove PP has the triangle shape having the discontinuous surface, so that the air layer Ag is provided on one surface of the pattern film PF contacting the upper polarizing plate POL2 at the location corresponding to the boundary between the subpixels MSP1 and MSP2.

The second embodiment of the invention described the triangular pattern groove PP so far. Other shapes may be used for pattern groove PP. For example, as shown in FIG. 13, the pattern groove PP may have the trapezoid shape, so that the air layer Ag is provided on one surface of the pattern film PF contacting the upper polarizing plate POL2 at the location corresponding to the boundary between the subpixels MSP1 and MSP2.

Effects of the embodiments of the invention are described through the simulation below.

Figure 14:
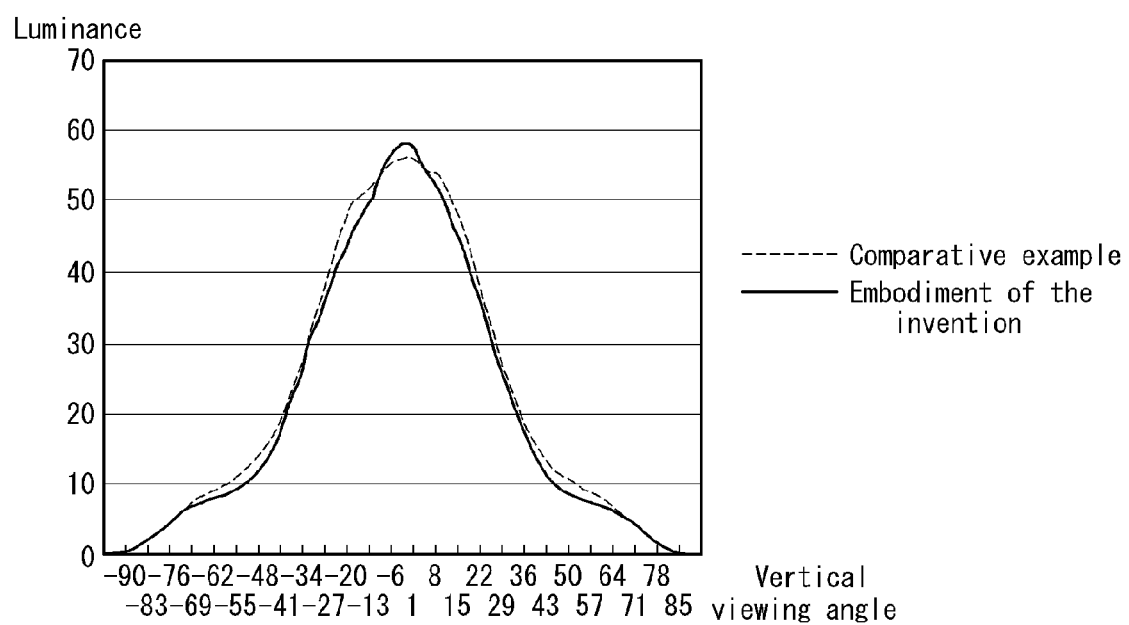
FIG. 14 is a simulation graph for comparing luminances of a comparative example and an embodiment of the invention.
Figure 15:
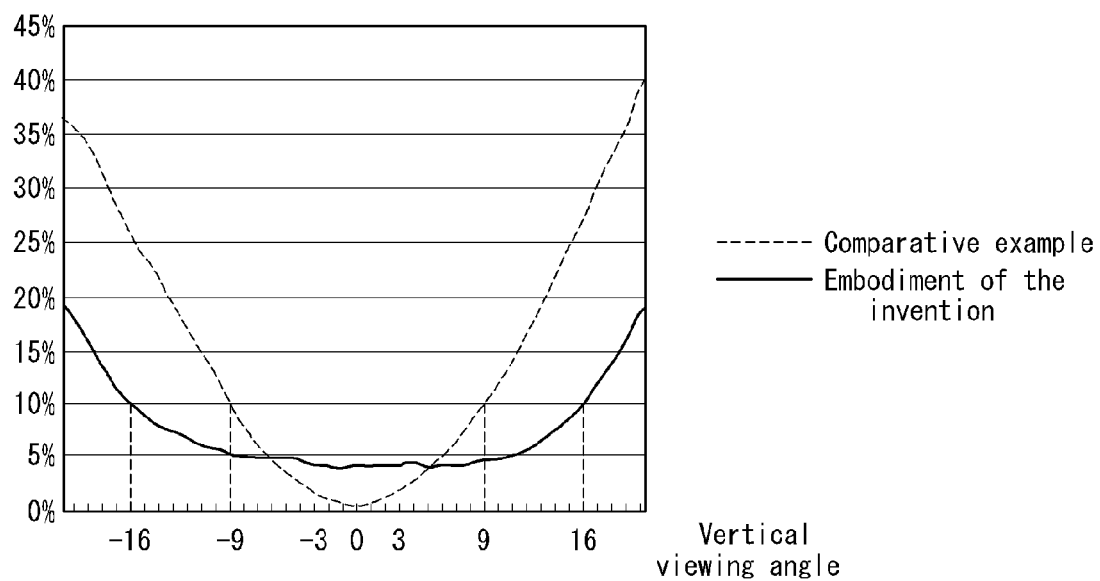
FIG. 15 is a simulation graph for comparing vertical viewing angles of a comparative example and an embodiment of the invention.

FIG. 14 is a simulation graph for comparing luminances of a comparative example and the embodiment of the invention. FIG. 15 is a simulation graph for comparing vertical viewing angles of a comparative example and the embodiment of the invention.

Experiments illustrated in FIGS. 14 and 15 were conducted based on a 47-inch stereoscopic image display, in which a polarizing plate having a thickness of about 180 µm is attached to a liquid crystal display panel including the 0.5T glass substrate. The comparative example illustrated in FIGS. 14 and 15 has a structure in which a black stripe is formed on a patterned retarder film. The embodiment of the invention illustrated in FIGS. 14 and 15 has a structure in which the prism-shaped pattern groove is formed on one surface of the color filter substrate of the liquid crystal display panel or one surface of the pattern film.

As shown in FIG. 14, the luminance of the stereoscopic image display according to the embodiment of the invention was greater than the luminance of the stereoscopic image display according to the comparative example in a middle range of the vertical viewing angle. FIG. 14 illustrates that a maximum luminance in the embodiment of the invention and the comparative example is less than 60 nit. However, it is only an example, and thus the embodiment of the invention is not limited thereto.

As shown in FIG. 15, the vertical viewing angle in the comparative example was ±18 degrees when a crosstalk was about 10%. On the other hand, the vertical viewing angle in the embodiment of the invention was ±32 degrees when the crosstalk was about 10%.

As described above, the stereoscopic image display according to the embodiment of the invention converts a path of light generating the crosstalk between the left eye image and the right eye image using the pattern groove formed on one surface of the color filter substrate of the liquid crystal display panel or one surface of the pattern film, thereby increasing the vertical viewing angle. Further, the stereoscopic image display according to the embodiment of the invention may increase the vertical viewing angle even if the black stripe of the patterned retarder film used to prevent the crosstalk between the left eye image and the right eye image is removed.

The stereoscopic image display according to the embodiment of the invention converts a path of light generating the crosstalk using the pattern groove having the air layer formed on one surface of the liquid crystal display panel or one surface of the pattern film and distributes light through the total reflection and the diffuse reflection, thereby increasing the vertical viewing angle. Furthermore, the stereoscopic image display according to the embodiment of the invention may increase the vertical viewing angle even if the black stripe of the patterned retarder film is removed.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display comprising:
a display panel including subpixels;
a polarizing plate attached to a display surface of the display panel;
a patterned retarder film attached to one surface of the polarizing plate; and
a pattern groove including an air layer on one surface of an upper substrate of the display panel contacting the polarizing plate at a location corresponding to a boundary between the subpixels, wherein the one surface of the upper substrate includes flat surfaces without the pattern groove at locations corresponding to the subpixels.

2. The stereoscopic image display of claim 1, wherein the pattern groove includes a plurality of peaks and a plurality of valleys and provides the air layer.

3. The stereoscopic image display of claim 1, wherein the pattern groove includes a plurality of peaks and a plurality of valleys and forms a triangular cross section along with a portion of the upper substrate contacting the polarizing plate, thereby providing the air layer.

4. The stereoscopic image display of claim 3, wherein lengths of three sides forming the triangular cross section are substantially equal to or different from one another.

5. The stereoscopic image display of claim 1, wherein the pattern groove includes a plurality of peaks and a plurality of valleys and forms a triangular cross section along with a portion of the upper substrate contacting the polarizing plate, thereby providing the air layer, wherein the triangular cross section of the pattern groove has a right triangle shape in which an interior angle of the side contacting the polarizing plate is a right triangle.

6. The stereoscopic image display of claim 1, wherein the pattern groove includes a plurality of peaks and a plurality of valleys and forms a triangular cross section along with a portion of the upper substrate contacting the polarizing plate, thereby providing the air layer, and
wherein the plurality of peaks and valleys have a continuous or discontinuous pattern.

7. The stereoscopic image display of claim 1, wherein the pattern groove includes a plurality of peaks and a plurality of valleys and forms a trapezoid shaped cross section along with a portion of the upper substrate contacting the polarizing plate, thereby providing the air layer.

8. The stereoscopic image display of claim 1, wherein each of the subpixels includes a main subpixel and an active black stripe which is less than the size of the main subpixel.

9. The stereoscopic image display of claim 8, wherein the pattern groove is formed at a location corresponding to a formation area of the active black stripe.

10. The stereoscopic image display of claim 8, wherein the pattern groove includes a plurality of peaks and a plurality of valleys and provides the air layer, and
wherein lengths of the peaks, lengths of the valleys, and interior angles formed by the peaks and the valleys are varied depending on a width of the active black stripe.

11. A stereoscopic image display, comprising:
a display panel including subpixels;
a polarizing plate positioned on a display surface of the display panel;
a patterned retarder film attached to one surface of the polarizing plate; and
a pattern film attached between the display panel and the polarizing plate, the pattern film including a pattern groove having an air layer on one surface of the pattern film contacting the polarizing plate at a location corresponding to a boundary between the subpixels,
wherein the one surface of the pattern film includes flat surfaces without the pattern groove at locations corresponding to the subpixels.

12. The stereoscopic image display of claim 11, wherein the pattern groove includes a plurality of peaks and a plurality of valleys and provides the air layer.

13. The stereoscopic image display of claim 11, wherein the pattern groove includes a plurality of peaks and a plurality of valleys and forms a triangular cross section along with a portion of the pattern film contacting the polarizing plate, thereby providing the air layer.

14. The stereoscopic image display of claim 13, wherein lengths of three sides forming the triangular cross section are substantially equal to or different from one another.

15. The stereoscopic image display of claim 11, wherein the pattern groove includes a plurality of peaks and a plurality of valleys and forms a triangular cross section along with a portion of the pattern film contacting the polarizing plate, thereby providing the air layer,
wherein the triangular cross section of the pattern groove has a right triangle shape in which an interior angle of the side contacting the polarizing plate is a right triangle.

16. The stereoscopic image display of claim 11, wherein the pattern groove includes a plurality of peaks and a plurality of valleys and forms a triangular cross section along with a portion of the pattern film contacting the polarizing plate, thereby providing the air layer, and
wherein the plurality of peaks and valleys have a continuous or discontinuous pattern.

17. The stereoscopic image display of claim 11, wherein the pattern groove includes a plurality of peaks and a plurality of valleys and forms a trapezoid shaped cross section along with a portion of the pattern film contacting the polarizing plate, thereby providing the air layer.

18. The stereoscopic image display of claim 11, wherein each of the subpixels includes a main subpixel and an active black stripe which is less than the size of the main subpixel.

19. The stereoscopic image display of claim 18, wherein the pattern groove is formed at a location corresponding to a formation area of the active black stripe.

20. The stereoscopic image display of claim 18, wherein the pattern groove includes a plurality of peaks and a plurality of valleys and provides the air layer, and
wherein lengths of the peaks, lengths of the valleys, and interior angles formed by the peaks and the valleys are varied depending on a width of the active black stripe.

21. A stereoscopic image display, comprising:
a display panel including subpixels;
a polarizing plate attached to a display surface of the display panel;
a patterned retarder film attached to one surface of the polarizing plate; and
a pattern groove including an air layer on one surface of an upper substrate of the display panel contacting the polarizing plate at a location corresponding to a boundary between the subpixels,
wherein each of the subpixels includes a main subpixel and an active black stripe which is less than the size of the main subpixel,
wherein the pattern groove includes a plurality of peaks and a plurality of valleys and provides the air layer, and
wherein lengths of the peaks, lengths of the valleys, and interior angles formed by the peaks and the valleys are varied depending on a width of the active black stripe.

22. A stereoscopic image display, comprising:
a display panel including subpixels;
a polarizing plate positioned on a display surface of the display panel;
a patterned retarder film attached to one surface of the polarizing plate; and
a pattern film attached between the display panel and the polarizing plate, the pattern film including a pattern groove having an air layer on one surface of the pattern film contacting the polarizing plate at a location corresponding to a boundary between the subpixels,
wherein each of the subpixels includes a main subpixel and an active black stripe which is less than the size of the main subpixel,
wherein the pattern groove includes a plurality of peaks and a plurality of valleys and provides the air layer, and
wherein lengths of the peaks, lengths of the valleys, and interior angles formed by the peaks and the valleys are varied depending on a width of the active black stripe.

* * * * *